(12) United States Patent
Mallis et al.

(10) Patent No.: US 9,052,041 B2
(45) Date of Patent: Jun. 9, 2015

(54) WEDGE THREADS WITH A SOLID LUBRICANT COATING

(75) Inventors: David Llewellyn Mallis, The Woodlands, TX (US); Andrea L. Reade-Romero, The Woodlands, TX (US)

(73) Assignee: Hydril Company, Houston, TX (US)

( * ) Notice: Subject to any disclaimer, the term of this patent is extended or adjusted under 35 U.S.C. 154(b) by 195 days.

(21) Appl. No.: 13/284,404

(22) Filed: Oct. 28, 2011

(65) Prior Publication Data

US 2012/0038147 A1 Feb. 16, 2012

Related U.S. Application Data

(63) Continuation of application No. 12/897,519, filed on Oct. 4, 2010.

(60) Provisional application No. 61/251,124, filed on Oct. 13, 2009.

(51) Int. Cl.
| | |
|---|---|
| *F16L 15/06* | (2006.01) |
| *C10M 145/28* | (2006.01) |
| *F16L 15/00* | (2006.01) |
| *B21C 23/24* | (2006.01) |

(52) U.S. Cl.
CPC .......... *F16L 15/001* (2013.01); *Y10T 29/49888* (2015.01); *C10N 2250/08* (2013.01); *C10M 2209/104* (2013.01); *B21C 23/24* (2013.01); *F16L 15/06* (2013.01); *C10M 145/28* (2013.01)

(58) Field of Classification Search
CPC ..................... C10N 2250/08; Y10T 29/49888; F16L 15/001; F16L 15/06; B21C 23/24; C10M 148/28; C10M 2209/104
USPC .......................... 508/577, 591; 285/94; 74/46
See application file for complete search history.

(56) References Cited

U.S. PATENT DOCUMENTS

| | | |
|---|---|---|
| RE30,647 E | 6/1981 | Blose |
| 4,703,954 A | 11/1987 | Ortloff et al. |
| RE34,467 E | 12/1993 | Reeves |
| 5,454,605 A | 10/1995 | Mott |
| 6,206,436 B1 | 3/2001 | Mallis |
| 7,326,015 B2 | 2/2008 | Reynolds, Jr. |
| 8,534,712 B2 | 9/2013 | Nunez |

(Continued)

FOREIGN PATENT DOCUMENTS

| | | |
|---|---|---|
| WO | 2004033951 A1 | 4/2004 |
| WO | WO 2008116891 A1 * | 10/2008 |

OTHER PUBLICATIONS

Office Action issued in related U.S. Appl. No. 12/897,519 dated May 15, 2014 (9 pages).

(Continued)

*Primary Examiner* — Taiwo Oladapo
(74) *Attorney, Agent, or Firm* — Osha Liang LLP

(57) ABSTRACT

A tubular connection includes a pin member having external wedge threads configured to engage a box member having corresponding internal wedge threads, and a solid lubricant coating applied on at least one of the internal and external wedge threads wherein the solid lubricant coating comprises a first uniform layer of a dry corrosion inhibiting coating made of an epoxy resin containing particles of zinc and a second uniform layer of a dry lubricant coating covering the first uniform layer.

13 Claims, 2 Drawing Sheets

(56) References Cited

U.S. PATENT DOCUMENTS

| | | |
|---|---|---|
| 8,535,762 B2 | 9/2013 | Nunez |
| 2004/0084901 A1* | 5/2004 | Church .................... 285/333 |
| 2004/0113423 A1* | 6/2004 | Dell'Erba et al. .............. 285/55 |
| 2007/0048108 A1 | 3/2007 | Reynolds |
| 2007/0170722 A1* | 7/2007 | Reynolds et al. ............ 285/334 |
| 2008/0054633 A1 | 3/2008 | Reynolds |
| 2008/0084060 A1 | 4/2008 | Reynolds |
| 2008/0129044 A1 | 6/2008 | Carcagno et al. |
| 2011/0084477 A1* | 4/2011 | Mallis et al. .................... 285/94 |
| 2014/0284919 A1 | 9/2014 | Goto et al. |

OTHER PUBLICATIONS

Office Action issued in related U.S. Appl. No. 12/897,519 dated Dec. 2, 2014 (9 pages).

* cited by examiner

WEDGE THREADS WITH A SOLID LUBRICANT COATING

CROSS-REFERENCE TO RELATED APPLICATIONS

This present application is a continuation application, and thus claims benefit pursuant to 35 U.S.C. §120. of U.S. patent application Ser. No. 12/897,519 filed Oct. 4, 2010, currently pending, which claims priority under 35 U.S.C. §119(e), to U.S. patent application Ser. No. 61/251,124, filed on Oct. 13, 2009, which is assigned to the present assignee and herein incorporated by reference in its entirety.

BACKGROUND

1. Field of the Disclosure

Embodiments disclosed herein relate generally to wedge thread connections. More particularly, embodiments disclosed herein relate to wedge threads having a solid lubricant coating permanently bonded thereon and related methods of permanently bonding the solid lubricant coating on the wedge threads.

2. Background Art

One type of threaded connection commonly used in oil country tubular goods is known as a wedge thread. Referring initially to FIGS. 1A and 1B, a prior art tubular connection 100 having a wedge thread is shown. As used herein, "wedge threads" are threads, regardless of a particular thread form, that increase in width (i.e., axial distance between load flanks 225 and 226 and stab flanks 232 and 231) in opposite directions on a pin member 101 and a box member 102. The rate at which the threads change in width along the connection is defined by a variable known as the "wedge ratio." As used herein, "wedge ratio," although technically not a ratio, refers to the difference between the stab flank lead and the load flank lead, which causes the width of the threads to vary along the connection. Furthermore, as used herein, a thread "lead" refers to the differential distance between components of a thread on consecutive threads. As such, the "stab lead" is the distance between stab flanks of consecutive thread pitches along the axial length of the connection.

A detailed discussion of wedge ratios is provided in U.S. Pat. No. 6,206,436, issued to Mallis, assigned to the assignee of the present disclosure, and incorporated by reference in its entirety herein. Furthermore, wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present disclosure and incorporated herein by reference in their entirety.

Referring still to FIGS. 1A and 1B, in wedge threads, a thread seal may be accomplished through contact pressure caused by interference that occurs at make-up over at least a portion of connection 100 between pin load flank 226 and box load flank 225 and between pin stab flank 232 and box stab flank 231. Close proximity or interference between roots 292 and 221 and crests 222 and 291 complete the thread seal when occurring proximate to such flank interference. Generally, higher pressures may be contained either by increasing interference between the roots and crests ("root/crest interference") on pin member 101 and box member 102 or by increasing the aforementioned flank interference.

Prior to make-up, a flowing joint compound commonly referred to as "pipe dope" is typically applied to surfaces of a threaded connection to improve the thread seals and provide lubrication during make-up of the connection. For example, the pipe dope may assist a wedge-threaded connection in achieving a thread seal between load and stab flanks thereof, e.g., as disclosed in U.S. Pat. No. RE 34,467 issued to Reeves. Further, pipe dope may protect the threads of the pin and box members from friction galling during make-up and break-out.

A flowing joint compound such as pipe dope may be used in wedge thread connections because of the close-fitting manner in which wedge threads make-up. As previously mentioned, wedge threads rely on a full surface contact theory, which means that each contact surface, i.e., corresponding roots/crests and stab and load flank surfaces are either in close proximity or full interference. Thus, due to the tight-fitting characteristics of wedge threads from multiple thread surface interferences, a pipe dope is used so that as the connection is made up and corresponding thread surfaces come together, the pipe dope may be squeezed out so as not to impede the proper engagement of the thread surfaces.

The use of pipe dope in wedge thread connections is not without certain deficiencies. When a wedge thread connection is made-up, excess pipe dope may become trapped (rather than being squeezed out) between the pin threads and the box threads, which may either cause false elevated torque readings (leading to insufficient make-up or "stand-off") or, in certain circumstances, damage the connection. Attempts to mitigate pipe stand-off have come in the form of providing features in the thread form to reduce a build-up in pressure of pipe dope used in the make-up of the threaded connections, e.g., U.S. Publication No. 2008/0054633, assigned to the assignee of the present application and incorporated herein by reference in its entirety. In addition, problems associated with excess pipe dope on wedge-threaded connections may be avoided by restricting the amount of pipe dope applied and by controlling the speed at which the wedge-threaded connection is made-up. Limiting the make-up speed of a wedge-threaded connection allows the pipe dope to travel and squeeze out before it becomes trapped within the connection at high pressures. However, limiting the make-up speed of the connection slows down the overall process of assembling the drillstring.

Pipe stand-off due to inadequate evacuation of pipe dope is detrimental to the structural integrity of wedge thread connections. As the pressure build-up may bleed off during use, the connection is at risk of accidentally backing-off during use. Therefore, stand-off in wedge thread connections is of particular concern as it may lead to loss of seal integrity or even mechanical separation of two connected members. Furthermore, pipe stand-off may be particularly problematic in strings used at elevated downhole service temperatures (i.e., the temperature a tubular would be expected to experience in service). Particularly, in high temperature service (e.g., temperatures greater than 250° F., a steam-flood string, or a geothermal string), even a small amount of stand-off may be deleterious. For example, if a made up wedge thread connection having even an infinitesimal amount of stand-off is deployed to a high temperature well, the pipe dope may flow out of the wedge thread connection, thus reducing the integrity of the thread seal. Further, use of a flowing pipe dope in wedge threads may lead to thread seal leaks, particularly at elevated pressures, as the viscosity of the pipe dope increases.

Larger OD wedge threads, which utilize pipe dope, may typically require a second application of torque to insure a complete make-up of the threaded connection. Because of the length and configuration of the wedge thread, the larger diameter connections may be susceptible to hydraulic lock and require extra torque to push the thread dope (i.e., force the thread dope to flow) along the length of the connection. Such a procedure is commonly known as "double bumping" a connection because torque is applied a number of times to "squeeze" the pipe dope along the threads. Notably, double bumping increases connection make-up time.

Accordingly, there exists a need for a thread lubricant capable of being used in tight-fitting wedge thread connections that substantially reduces pipe stand-off concerns and is effective at elevated downhole temperatures.

SUMMARY OF THE DISCLOSURE

In one aspect, embodiments disclosed herein relate to a tubular connection including a pin member having external wedge threads configured to engage a box member having corresponding internal wedge threads and a solid lubricant coating permanently bonded on at least one of the internal and external wedge threads.

In other aspects, embodiments disclosed herein relate to a method of manufacturing a connection having wedge threads, the method including machining internal wedge threads on a box member and external wedge threads on a pin member, wherein the internal and external wedge threads are configured to correspond and permanently bonding a solid lubricant coating on at least one of the internal and external wedge threads.

Other aspects and advantages of the invention will be apparent from the following description and the appended claims.

DETAILED DESCRIPTION

In one aspect, embodiments disclosed herein relate to a wedge thread connection with a solid lubricant coating permanently bonded thereon and related methods of permanently bonding the solid lubricant coating to the wedge threads. The threaded connection may include a corresponding pin member and box member having wedge threads formed thereon. The solid lubricant coating may be permanently bonded on the pin member, the box member, or both the pin and box members prior to make-up of the connection. One or more layers of the solid lubricant coating may be used depending on the type of end configurations of the connection (i.e., full length pin, full length box, or coupling).

Figure 1A:
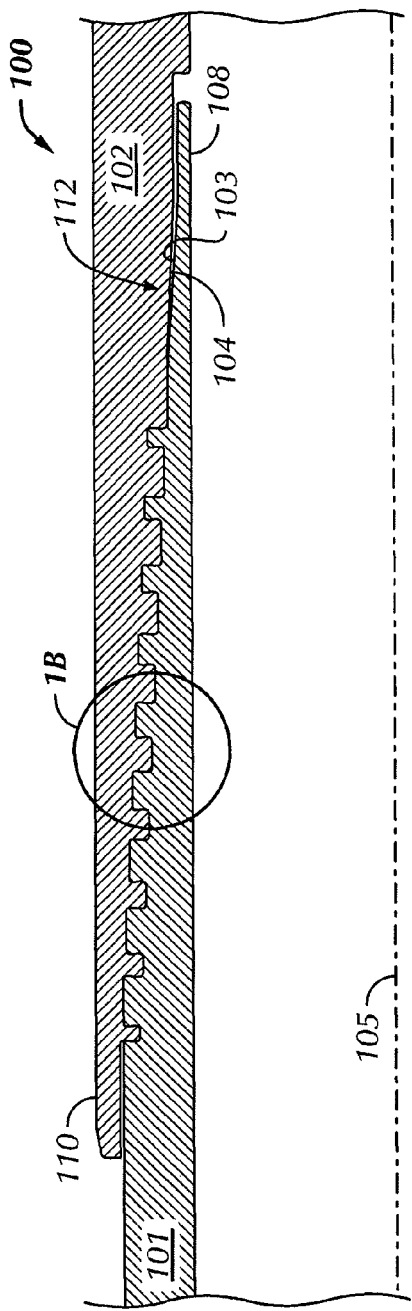
FIGS. 1A and 1B show cross-sectional views of a prior art tubular connection having wedge threads.
Figure 1B:
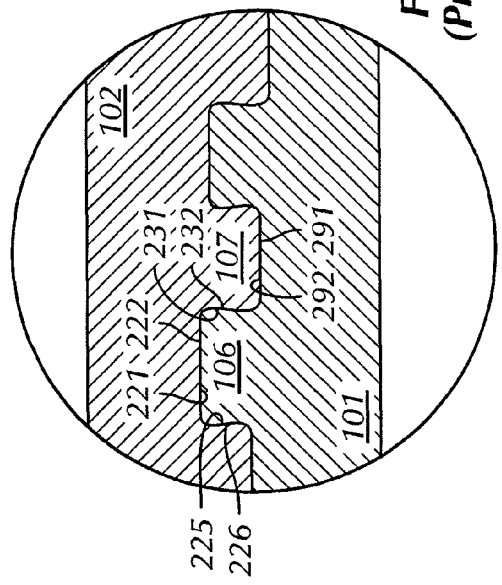
Figure 2:
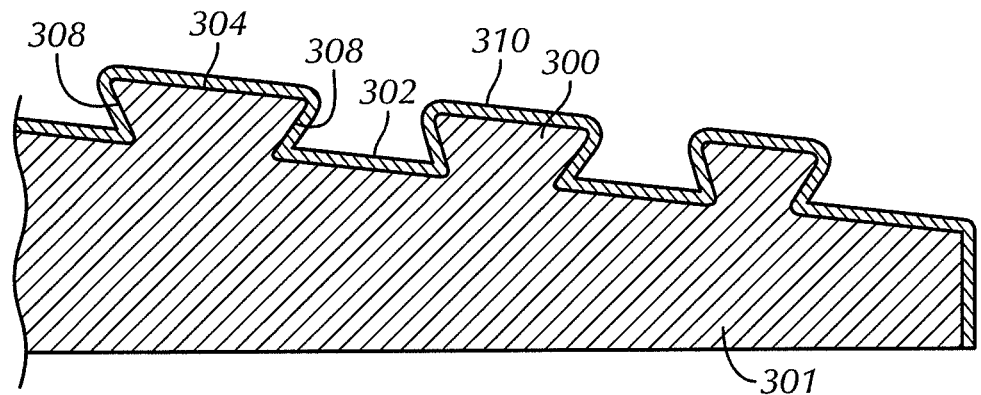
FIG. 2 shows a cross-sectional view of a solid lubricant coating on a wedge thread in accordance with embodiments of the present disclosure.

Referring now to FIG. 2, a cross-sectional view of a wedge thread 300 having a solid lubricant coating 310 permanently bonded thereon is shown in accordance with embodiments of the present disclosure. The wedge thread 300 is formed on a tubular member 301, which may be either a pin member or box member. As shown, solid lubricant coating 310 may be permanently bonded to an entire surface of the wedge thread 300, including thread roots 302, thread crests 304, stab flanks 306, and load flanks 308.

As used herein, permanently bonded refers to adhesion of the solid lubricant coating to the wedge thread surfaces after the coating is properly cured, such that the solid lubricant coating 310 does not "flow" during makeup of the connection, but rather, remains as a rigid structure. As such, during make-up of the wedge thread connection the solid lubricant coating 310 behaves as a solid structure and does not flow as a typical pipe dope lubricant would due to forces created by contacting thread roots 302 and thread crests 304, and stab flanks 306 and load flanks 308. While the solid lubricant does not flow, the solid lubricant coating may be a pliable compound and somewhat resilient, so that upon make-up of the wedge thread connection the solid lubricant coating 310 may deform slightly to fill voids in the thread flanks (caused by imperfections in the flanks) over multiple make-ups and break-outs of the connection. Unlike a flowing thread compound, which may rely on surface tension to fill the voids in the thread flanks for sealability, the solid lubricant coating 310 of one or more embodiments disclosed herein permanently adheres to and/or bonds to the wedge thread surfaces.

Figure 3:
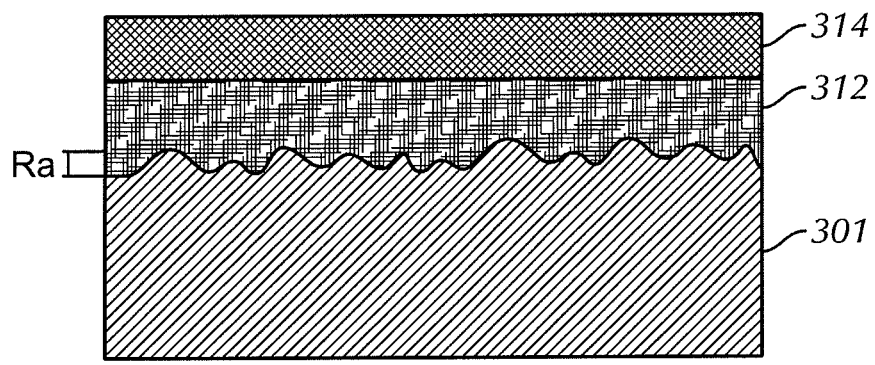
FIG. 3 shows an enlarged detail view of a solid lubricant coating near the thread surface in accordance with embodiments of the present disclosure.

A magnification of a composition of solid lubricant coating 310 is shown in FIG. 3 in accordance with embodiments of the present disclosure. As shown, an uncoated surface of wedge thread 300 (FIG. 2) may have an average surface roughness Ra of between about 2 and 6 μm. In certain embodiments, the uncoated thread surface may have an average surface roughness of between 1 and 10 μm. Surface treatment or preparation of the base metal of the wedge thread surfaces may be required to prepare the thread surface and serves as an anchor so the solid lubricant coating properly adheres to and is permanently bonded to the wedge threads. Surface treatment of the wedge thread surfaces may include abrasive blasting and/or phosphate coating.

After surface preparation of the wedge thread surfaces (if needed), a first solid coating (a uniform or substantially constant thickness layer) may be applied and permanently bonded on the wedge thread surface. The first solid coating may be comprised of an epoxy resin containing particles of zinc (Zn). In certain embodiments, the first solid coating may be a corrosion inhibiting coating, or have corrosion inhibiting properties. The content of the particles of zinc in the epoxy resin may be equal to or greater than about 80% by mass. In certain embodiments, the zinc particles may have at least 99% purity. In other embodiments, the zinc particles may have at least 97.5% purity. The first coating 312 may have a thickness value of between about 15 and 35 μm. In certain embodiments, the first coating 312 may have a thickness value of between 20 and 30 μm.

A second solid coating 314 (e.g., a solid dry lubricant coating) may be subsequently applied and permanently bonded on the first coating 312 and/or the wedge thread surfaces. In one embodiment, the second coating 314 may be comprised of a mixture of molybdenum disulfide ($MoS_2$) and other solid lubricants in an inorganic binder. Other solid lubricants may include, but are not limited to, graphite, tungsten disulfide, boron nitride, and polytetrafluoroethylene ("PTFE"). In one or more embodiments disclosed herein, the type of binder in which the solid lubricants are dispersed may include organic, inorganic, metallic, and ceramic. One of ordinary skill in the art will understand selection of the type of binder in which the solid lubricant may be dispersed based on mechanical properties of materials of the threaded connection.

The second coating 314 may have a thickness of between about 5 and 25 μm. In certain embodiments, the first coating 312 may have a thickness value of between 10 and 20 μm. First coating 312 may be applied to the wedge threads by spraying, brushing, dipping or any other method known in the art in which the coating thickness can be controlled. Similarly, the second coating 314 may be applied to the wedge threads by spraying, brushing, dipping or any other method known in the art in which the coating thickness can be controlled once the first coating 312 is fully cured and/or dried.

Figure 4:
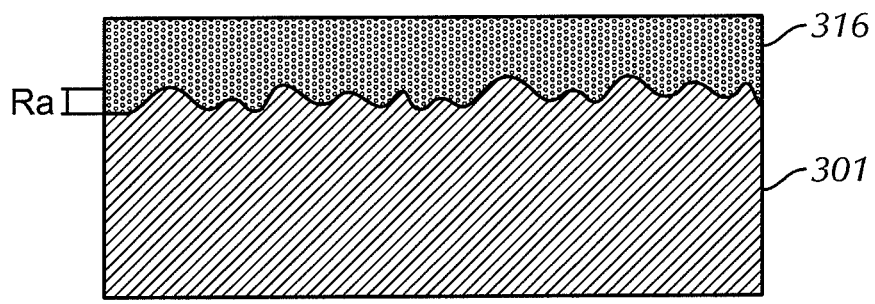
FIG. 4 shows an enlarged detail view of an alternative solid lubricant coating near the thread surface in accordance with embodiments of the present disclosure.

Referring now to FIG. 4, an enlarged view of solid lubricant coating 310 (FIG. 2) is shown in accordance with alternate embodiments of the present disclosure. In certain embodiments of the present disclosure, the first coating 312 and the second coating 314 of the embodiment shown in FIG. 3 may be combined into one solid coating 316. In one embodiment, the combined solid coating 316 may be a uniform layer of a dry corrosion inhibiting coating, which has a dispersion of particles of solid lubricant mixed therein, as shown in FIG. 4. Solid lubricants may include, but are not limited to, molybdenum disulfide ($MoS_2$) graphite, tungsten disulfide, boron nitride, and polytetrafluoroethylene ("PTFE"). Those skilled in the art will be familiar with combining the dry corrosion inhibiting coating with particles of solid lubricant prior to applying and bonding the coating to the wedge threads.

The thickness of the combined dry corrosion inhibiting coating 316 may be between about 15 and 35 µm. In certain embodiments, dry corrosion inhibiting coating 312 may have a thickness value of between 20 and 30 µm. The layer of dry corrosion inhibiting coating 316 containing the dispersion of particles of solid lubricant may be applied by spraying, brushing, dipping or any other method known in the art in which the coating thickness can be controlled. Additional discussion of solid lubricant coatings may be found in International Application PCT/EP2003/011238 and U.S. Publication No. 2008/129044, both of which are assigned to Tenaris Connections and incorporated herein by reference in their entirety.

The solid lubricant coating may be effective at elevated temperatures as well as ambient temperatures. Solid lubricant coatings may be able to withstand much higher temperatures (e.g., 200° C.-350° C.) and not break down. Thus sealing capabilities are maintained at elevated temperatures, unlike grease-based thread compounds, which may lose viscosity at elevated temperatures and substantially reduces the thread compound's resistance to flow. Solid lubricants of embodiments disclosed herein are formulated to perform over a range of elevated temperatures as well as at an ambient temperature.

The solid lubricant coating of embodiments disclosed herein may provide a number of advantages. In particular, the connection may experience improved sealing characteristics over the currently used grease-based (i.e., flowing) thread lubricants as follows. First, the solid lubricant coating will not continue to flow through the threads over time or with loading of the connection, which for greases reduces the sealing capability and resistance to breakout torque. Second, the solid lubricant coating will not disintegrate or lose viscosity at elevated temperature, which for greases reduces or even eliminates the sealing capability. Finally, the solid lubricant coating, when applied on one or both members may have the ability to laminate (e.g., fill in) imperfections or small amounts of damage caused during multiple make-ups and break-outs of the connection.

Additionally, embodiments of the present disclosure may provide a solid lubricant for wedge threads that eliminates the possibility of pipe stand-off due to dope entrapment and subsequent bleed-off because of the solid lubricant's resistance to flow. Furthermore, Applicant has advantageously found that the solid lubricant coating disclosed in embodiments herein may be used with wedge threads without affecting the tight tolerances between engaging thread surfaces, which are typically associated with the structure and makeup of wedge threads. Finally, the solid lubricant coating of one or more embodiments disclosed herein may be precisely applied through controlled application of the solid lubricant coating onto the wedge thread surfaces, as opposed to brushing on by hand flowing pipe dope compounds, so as to apply a more even coating on the thread surfaces.

Further, the connections disclosed herein may be able to withstand increased torque during make-up. Occasionally, connections may be made up to higher torques than are recommended. As such, the wedge thread connection having the solid lubricant was subjected to an excessive amount of torque. For example, a 13.625 inch wedge thread connection was made-up with a 25% increase in torque while a 4.50 inch wedge thread connection was made-up with a 50% increase in torque. Further, the connections were subjected to multiple make-ups and break-outs (e.g., 12 consecutive make and break operations). Results showed that neither connection experienced any galling or deformation in the threaded sections. Thus, the solid lubricant coated threaded connection may be able to withstand higher make-up torques without damage to the connection.

Further still, the solid lubricant coating on the threads may advantageously reduce the total running time of the drillstring. First, embodiments disclosed herein allow for slightly more misalignment between pin and box members during make-up than previously. For example, a pin and box member of a 4.5 inch wedge thread connection having a solid lubricant thereon was misaligned at make-up up to about 15 degrees. After ten complete make-ups and break-outs of the connection, only minimal to no thread damage was observed on initial threads of the pin and box members.

Next, because a solid lubricant coating is used in place of the flowing pipe dope, the commonly used double bumping procedure during make-up is no longer required to squeeze flowing pipe dope out of the threads. As previously described, larger outer diameter wedge threads that utilize standard thread dope typically require a second application of torque to insure a complete make-up. Because of the length and configuration of the wedge thread, the larger diameter connections may be susceptible to hydraulic lock and require extra torque to push the thread dope along the length of the connection. With the removal of dope from the connection and its replacement by the solid lubricant coating in accordance with embodiments disclosed herein, hydraulic lock may no longer be an issue.

In addition, because the solid lubricant is permanently bonded on the threads, a dope compound does not have to be applied prior to make-up, thus reducing the total amount of running time and increasing the productivity of the rig. With a solid lubricant permanently bonded on the wedge threads, application of dope is no longer required, thereby eliminating an assembly step during the make-up procedure. In sum, the overall productivity of the rig may be increased. For example, during rig trials, total make-up time was studied using a 4.5 inch wedge thread connection having a solid lubricant thereon in accordance with embodiments disclosed herein. The average revolutions per minute ("RPM") during make-up was approximately 19 RPM's while the average RPM during break-out was approximately 21 RPM's. The average cycle time (i.e., the total time to make-up and then break-out the connection) was approximately two minutes, while a standard doped connection would have an average cycle time of 4 to 5 minutes.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A tubular connection comprising:
a pin member having external wedge threads configured to engage a box member having corresponding internal wedge threads; and
a solid lubricant coating permanently bonded on at least one of the internal and external wedge threads, wherein the solid lubricant coating comprises at least two material layers, wherein at least one of the material layers comprises a dry corrosion inhibiting coating made of an epoxy resin containing particles of zinc.

2. The tubular connection of claim 1, wherein at least one of the material layers comprises a dry lubricant coating.

3. The tubular connection of claim 1, wherein at least one of the material layers has a thickness of between about 15 and 35 μm.

4. The tubular connection of claim 1, wherein at least one of the material layers has a thickness of between about 20 and 30 μm.

5. The tubular connection of claim 1, wherein at least one of the material layers has a thickness of between about 10 and 20 μm.

6. The tubular connection of claim 1, wherein at least one of the material layers is comprised of a mixture of molybdenum disulfide ($MoS_2$) and other solid lubricants in an inorganic binder.

7. The threaded pipe connection of claim 1, wherein a surface treatment is applied on at least one of the internal and external wedge threads prior to application of the solid lubricant coating.

8. The threaded pipe connection of claim 7, wherein the surface treatment is selected from a group of surface treatments consisting of abrasive blasting and phosphate coating.

9. The threaded pipe connection of claim 1, wherein the solid lubricant coating is configured to withstand elevated temperatures between about 200° C. and 350° C.

10. The tubular connection of claim 1, wherein the internal and external wedge threads comprise a generally dovetail-shaped cross-section.

11. The tubular connection of claim 1, wherein the internal and external wedge threads have an average surface roughness of between about 2 and 6 μm.

12. The tubular connection of claim 1, wherein the solid lubricant coating comprises a dry corrosion inhibiting coating containing a dispersion of particles of solid lubricant therein.

13. A tubular connection comprising:
a pin member having external wedge threads configured to engage a box member having corresponding internal wedge threads; and
a solid lubricant coating permanently bonded on at least one of the internal and external wedge threads, wherein the solid lubricant coating comprises at least two material layers, wherein at least one of the material layers is comprised of a mixture of molybdenum disulfide ($MoS_2$) and other solid lubricants in an inorganic binder.

* * * * *